US007634675B2

(12) United States Patent
Liebenow

(10) Patent No.: US 7,634,675 B2
(45) Date of Patent: Dec. 15, 2009

(54) MONITOR POWER MANAGEMENT

(75) Inventor: Frank Liebenow, Dakota Dunes, SD (US)

(73) Assignee: Gateway, Inc., North Sioux City, SD (US)

( * ) Notice: Subject to any disclaimer, the term of this patent is extended or adjusted under 35 U.S.C. 154(b) by 633 days.

(21) Appl. No.: 10/235,177

(22) Filed: Sep. 5, 2002

(65) Prior Publication Data

US 2004/0049705 A1 Mar. 11, 2004

(51) Int. Cl.
*G06F 1/32* (2006.01)
(52) U.S. Cl. .................. 713/324; 713/310; 713/320; 713/323
(58) Field of Classification Search .............. 713/310, 713/320, 323, 324
See application file for complete search history.

(56) References Cited

U.S. PATENT DOCUMENTS

| 5,389,952 | A | | 2/1995 | Kikinis | 345/212 |
|---|---|---|---|---|---|
| 5,563,799 | A | * | 10/1996 | Brehmer et al. | 702/186 |
| 5,764,547 | A | * | 6/1998 | Bilich et al. | 713/321 |
| 5,774,116 | A | | 6/1998 | Pötsch | 345/211 |
| 5,880,719 | A | | 3/1999 | Kikinis | 345/212 |
| 5,886,689 | A | | 3/1999 | Chee et al. | 345/212 |
| 5,892,959 | A | | 4/1999 | Fung | 395/750.05 |
| 5,905,491 | A | | 5/1999 | Kim | 345/212 |
| 5,917,479 | A | | 6/1999 | Haapakoski | 345/211 |
| 5,944,830 | A | | 8/1999 | Hong et al. | 713/324 |
| 5,974,551 | A | * | 10/1999 | Lee | 713/300 |
| 6,005,559 | A | | 12/1999 | Miyamoto | 345/212 |
| 6,115,033 | A | | 9/2000 | Choi | 345/211 |
| 6,125,449 | A | | 9/2000 | Taylor et al. | 713/310 |
| 6,801,196 | B1 | * | 10/2004 | Bodley et al. | 345/211 |
| 6,845,277 | B1 | * | 1/2005 | Michelet et al. | 700/83 |
| 6,963,340 | B1 | * | 11/2005 | Alben et al. | 345/501 |
| 2003/0014675 | A1 | * | 1/2003 | Lee | 713/310 |

FOREIGN PATENT DOCUMENTS

EP    0678843 A2    11/1993

OTHER PUBLICATIONS

Arnold et al., "Control circuit for LED display—has generator with variable frequency and keying ratio to reduce power consumption by reducing LED brightness", Jun. 26, 1985, DD 224135A.*
Kaido, Katahito, "Erroneous Operation Preventing Device", Jul. 30, 1996, Japanese Patent 408195989A.*

* cited by examiner

*Primary Examiner*—Tse Chen
(74) *Attorney, Agent, or Firm*—Pearne & Gordon LLP

(57) ABSTRACT

A method of performing power down of a computer monitor when a video signal is no longer present and apparatus which performs the method schedules an automatic power conservation mode after a given period of time unless an inhibiting power sustain command embedded in the video signal is received. The power sustain command is placed in the regular video signal at a regular interval. The frequency of the command may be made shorter than the power-off timeout in order to maintain the power-on state of the monitor. Multiple time lapse thresholds may be set to permit multiple power conservation modes. This method may be implemented without making hardware changes in retrofitting a monitor.

18 Claims, 5 Drawing Sheets

MONITOR POWER MANAGEMENT

FIELD OF THE INVENTION

This invention generally relates to the field of power management for an information handling system and, more particularly, to a method of power conservation and power shut off for a computer monitor.

BACKGROUND OF THE INVENTION

Personal computer (PC) power consumption is a concern because of the sheer number of these power consuming devices. A large organization may have thousands of personal computers. Usually, a PC is equipped with a monitor. Power may not be efficiently used by PC monitors when they are left on overnight, when their screens are lit at an unnecessarily high intensity, or when the PCs are unused for extensive periods of time. Because of the scale involved, small power consumption savings on a PC by PC basis may result in huge costs for a large organization. Not only may large organizations benefit from power consumption savings, but an individual consumer may appreciate reducing power consumption and cost.

Current methods to conserve power only have a maximum of four power conservation modes. Current methods rely on the absence of one or both of the horizontal and vertical sync signals to the monitor to enter a lower power state. When the two sync signals are used as control bits, four power savings states are possible. With four power modes, there may be an on mode which does not save any power, a rapid recovery standby mode which may save 20% power, a slow recovery suspend mode which may save 80% power, and an off mode which may save nearly all power. However, these modes do not adequately adjust to changes in ambient light level, time of the day operations, and the like.

Aside from having a limited number of power conservation modes, current methods restrictively limit the time granted to respond to video signal line interruptions from an external processor, such as from a central processing unit of a computer. By relying on vertical and horizontal sync signals, the period of time to respond to a PC communications anomaly is limited from about 5 milliseconds to approximately 20 milliseconds because sync signals are regularly transmitted on a 50 Hz to 150 Hz basis. In certain situations, a time period of 20 milliseconds is too short to allow for PC anomaly correction such as when a user corrects a loose video cable connection. Even a simple solution to extend the time before a monitor enters a power conservation mode may require costly and time consuming hardware changes in retrofitting the monitor. Furthermore, when a computer system locks up for any reason, it can no longer perform useful work, yet its graphics subsystem still generates horizontal and vertical sync, hence not entering a lower power state.

Consequently, it would be desirable to have a greater number of power savings states in a monitor for providing precise power conservation levels. It would also be desirable to retrofit an existing monitor having four or fewer power conservation modes without changing hardware to save on installation costs.

SUMMARY OF THE INVENTION

The present invention provides a method and an apparatus for triggering entry into various monitor power conservation modes upon the absence of a command, such as a power sustain command. The method and apparatus uses a timer or multiple timers to detect the absence of the command for a sufficient amount of time before automatically entering a power conservation mode or shut down. The conditions for entering a monitor power conservation mode include loss of signal, a PC hard shut down, a disconnected cable, and computer user inactivity. Once the power conservation mode is entered, the return of the command signals the monitor to exit the power conservation mode and resume normal operation.

In a first aspect of the present invention, a method of conserving power in a monitor is provided in which the display device enters a power conservation mode if a power sustain command is not received within a predetermined period of time. The initial steps include receiving a Digital Data Channel (DDC) command or other signal separate or embedded in the video signal from a computer system which corresponds to a power sustain command. This may be a flag bit, a bit pattern, or command. Then, a determination is made if the portion of the video signal contains a power sustain command. A timer is reset if the command contains the power sustain command. The timer measures the time in which no power sustain command is received.

In a second aspect of the present invention, an apparatus employs a timer internal or external to a monitor interface which receives the video signal containing a power sustain command. This signal may be inserted into the Red, Green, or Blue analog or digital signals or it may be inserted into either horizontal or vertical sync. One method of inserting this signal would be to insert pulses into the Red, Green, or Blue signals during either horizontal or vertical blanking, so that the pulses would not interfere with the image projected on the monitor. The timer may count up or down to reach a threshold level. It may be implemented in other ways. When the threshold level is reached or surpassed, the apparatus enters a power conservation mode. In one implementation, a watchdog timer which is already part of the monitor is used with the power sustain command embedded in the video signal. This arrangement may be used to avoid hardware retrofitting of an existing monitor so as to save on cost and time.

This method allows a greater number of power-managed states than possible by controlling the absence or presence of two sync signals, by inserting a power sustain command in the video data stream and with a timing mechanism. In the present invention, the number of power savings states that may be implemented may be any number, including 1, 2, 3, 4, 5, and so on. Furthermore, the present method allows greater adjustability in the timing internal to the monitor and the timing and composition of the power sustain command embedded in the video signal to handle processor communications anomalies and to conserve power usage by the monitor. Furthermore, the present method will permit entry into a reduced power state should the computer system hang, freeze, or lock up.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of the present invention are shown.

The present invention provides a method of performing power down or power reduction of a computer monitor when the power sustain command or signal is no longer present. The method involves a monitor that regularly schedules an automatic shutdown or power conservation mode after a given period of time, unless an inhibiting power sustain command is received. The system includes a power sustain command embedded in the regular video signal at a regular interval or transmitted over an independent signaling means such as the Display Data Channel (DDC), which is a serial interface standard on many computer systems and monitors. The period with which the power sustain command is issued by a computer system may be made shorter than the monitor timeout period for receiving this command to maintain the power-on state of the monitor. The repetitive power sustain command from the computer system may be coupled with a watchdog timer in the monitor to allow the monitor to automatically transfer to a power conservation mode if communications with the computer system stops or is interrupted for any reason (e.g., PC hard power-off, PC locks up, cable disconnected, and the like.) for a predetermined length of time. A timer may be a separate component, may be a component integrated within the interface, or may be a software process. Use of the watchdog timer with the power sustain command may provide an implementation which does not require hardware retrofitting of an existing display device or monitor. Aside from CPU malfunction, the power sustain command may be excluded from the video signal by the processor under various circumstances, such as prolonged periods of PC user inactivity, the occurrence of certain days of the week, the occurrence of holidays, the occurrence of certain hours of the day, a severe weather alert, and the like.

Figure 1:
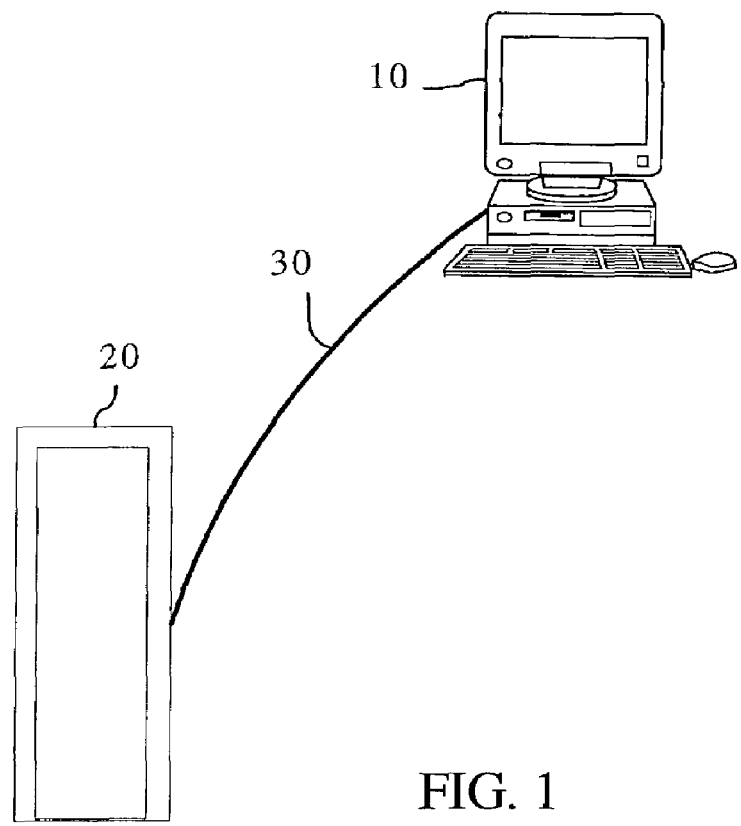
FIG. 1 illustrates a basic personal computer system of the present invention.

FIG. 1 illustrates a basic personal computer system of the present invention. A monitor, e.g., a cathode ray tube (CRT) monitor 10, is communicatively connected with a computer 20. The present invention is not limited to CRT monitors, but may be practiced with a variety of display devices, including flat screen devices such as plasma displays, field emission displays, liquid crystal displays, and the like. The connection between the monitor and the computer may be wireless, such as through radio frequency or infrared communications, or may be through a cable 30 connection. Data flow between the computer and the monitor may be in digital or analog form. The computer may be connected to a network and it may be coupled to other peripheral devices, such as a printer or scanner.

Figure 2:
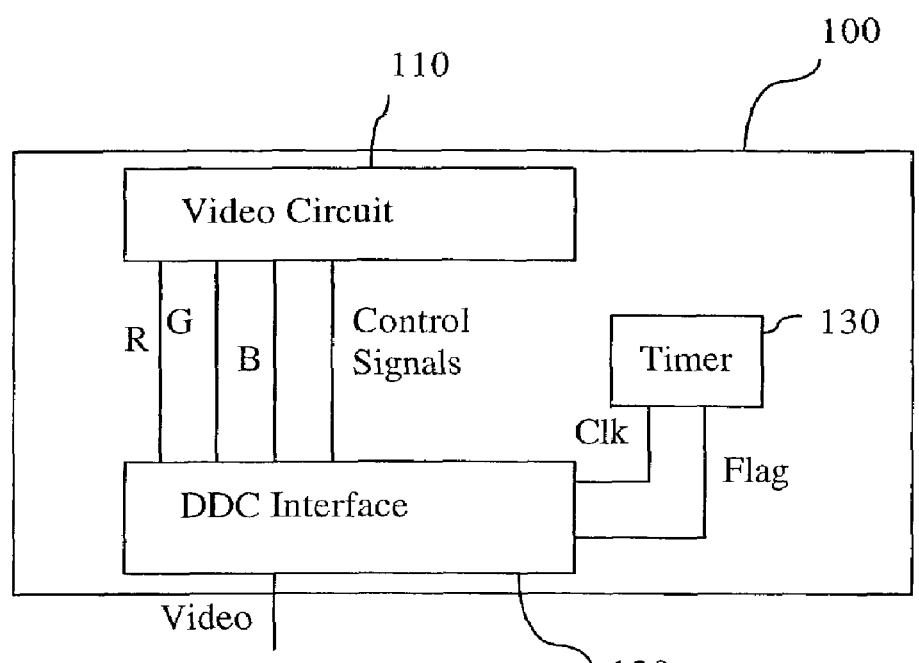
FIG. 2 illustrates a block diagram of the circuitry of the present invention.

FIG. 2 illustrates a block diagram of the monitor circuitry 100 of the present invention. An interface circuit 120 receives the signal from the computer either superimposed on any of the standard analog or digital signals or as part of the Data Display Channel communications. A DDC interface is a serial channel that provides a communications path between the video subsystem of the computer system, sometimes referred to as a video graphics adapter (VGA) and a monitor using the DDC format and is defined by the Video Electronics Standards Association (VESA). The present invention may use the DDC interface between the computer system and monitor to control power management within the monitor (e.g., put the monitor in suspend mode or virtual "off" mode). Another type of interface may be used in place of a DDC interface. The interface may strip out the bit patterns in certain fields of the signal and send them to another device internal to the monitor for processing, such as video circuit 110 and timer 130. The signal received by the monitor interface is processed to yield color data, such as red, green, and blue data, and various other information, such as control signals, which include the power sustain command in addition to any horizontal and vertical sync pulses that may be present.

Figure 3:
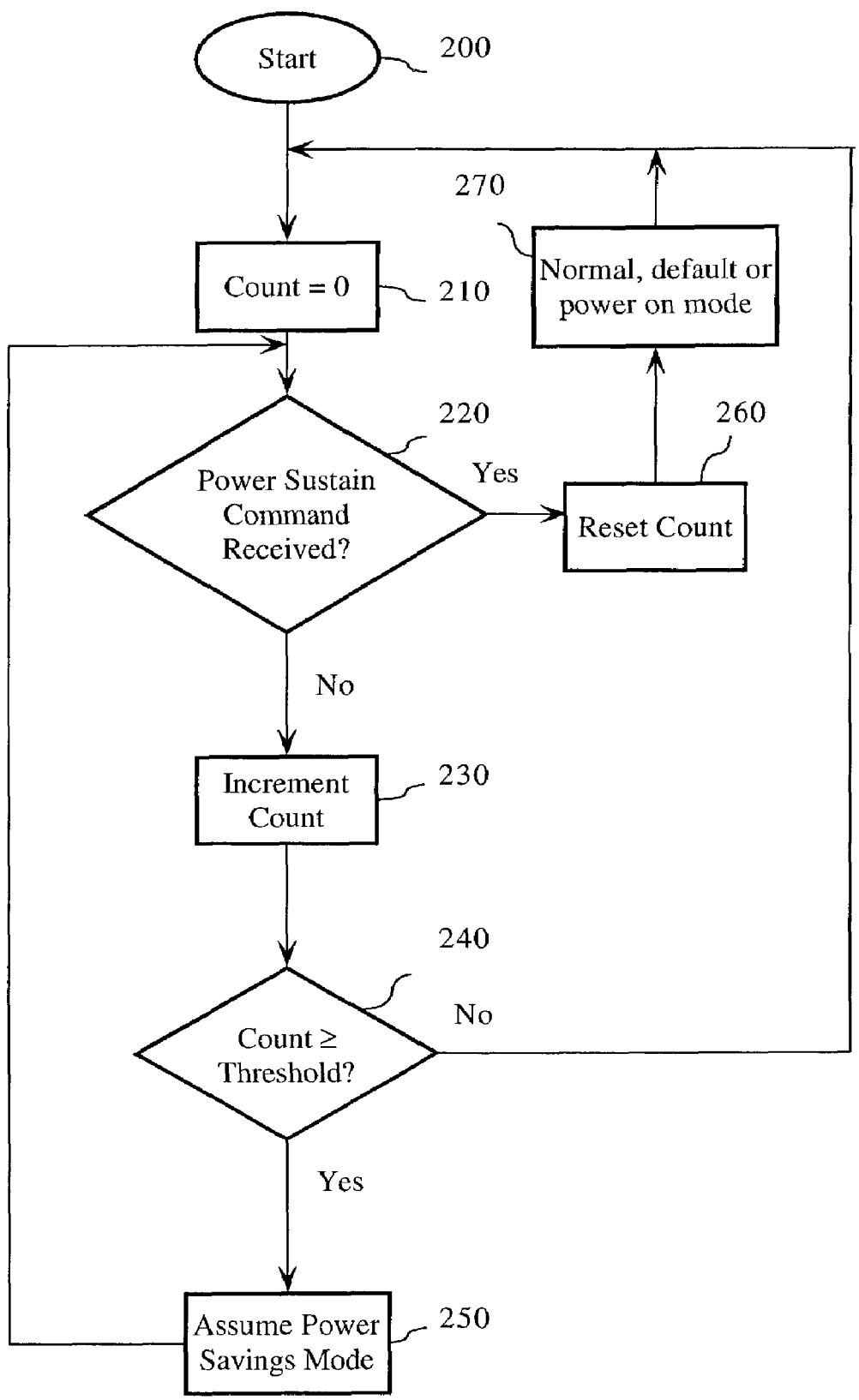
FIG. 3 illustrates a flow chart diagram illustrating an embodiment of the present invention.

FIG. 3 illustrates a flow chart diagram illustrating the method steps in an embodiment of the present invention. These steps may be implemented through a software process, hardware circuitry, firmware, or a combination of these. Initially, a counter is set to zero or another initial value, as in step 210. A determination is made as to whether a power sustain command has been received, as in step 220. The power sustain command may be a bit pattern in a certain field of the data transmitted by the computer system or a unique waveform from the computer system inserted into any of the signal lines coming from the computer system. The bit pattern may be a single bit or a several bits. The bit pattern may also include instructions on a monitor power setting so as to include the power modes that are to be entered and their order of entry during the timer count, a request for status information from the monitor, a request for a power sustain command acknowledge, and the like. The bit pattern may also include information for the monitor to use in setting the timeout value. The unique waveform may be of an amplitude or shape that is distinguishable from any other data sent by the computer. If the power sustain command has not been received, the count is incremented, as in step 230. Otherwise, the count is reset to zero, as in step 260, and the monitor is maintained or placed in the normal operating mode, such as a default full power on state, as per step 270. If the power sustain command has not been received in step 220, a determination is made as to whether the count exceeds a preset threshold, as in step 240. The threshold may be set by hardwiring the threshold input/output pins to a desired threshold level or may be set through software, either by a stored default value or by an entry made by a user. If the threshold level is reached or passed by the count, a power conservation mode is assumed, as per step 250. There may be two, three, four, five, or a greater number of power conservation modes. In an embodiment, there may be but a single power conservation mode, such as a very low power state that consumes only enough power as to monitor the interface for the resumption of the power sustain command. If the threshold level is not reached or passed by the count, processing returns to step 220. The power sustain command should be sent at a periodicity such that the command is received and interpreted by the interface before any time out threshold is reached.

The power sustain command may be used to carry out more functions than to merely indicate that power is to be sustained in the monitor or that there has been computer activity since the previous power sustain command. The power sustain command may inform the monitor or display device that a certain sequence of power conservation modes are to be entered. For example, this sequence may be on, standby, and off. In another example, this sequence may be simply on and standby. In another example, the sequence may be on, suspend, and off. In yet another example, the sequence may be on, daytime savings, standby, suspend, and off.

The power sustain command may be implemented in a variety of ways. Default values for the command may be retrieved from memory. The sequence of power conservation modes and time lapse values for entering the various modes may be entered manually be a user to create the power sustain command. Computer code which tracks the time of day and day of the week may determine the power sustain command. The command may be inserted into a video stream through a software, firmware, or hardware process or a combination thereof.

The present invention offers a greater number of power conservation modes than related methods. The power conservation modes, which may be practiced with this invention, include, but is not limited to, on, off, doze mode, daytime savings mode, sleep mode, standby mode, suspend mode, and the like. In doze mode, the monitor clock speed is slowed. Daytime savings mode occurs during computer inactivity during the business work day in which the screen is dimmed and/or a minimal number of monitor components are powered down to enable rapid screen recovery. These and other modes may be conventionally defined or customized according to the application.

Figure 4:
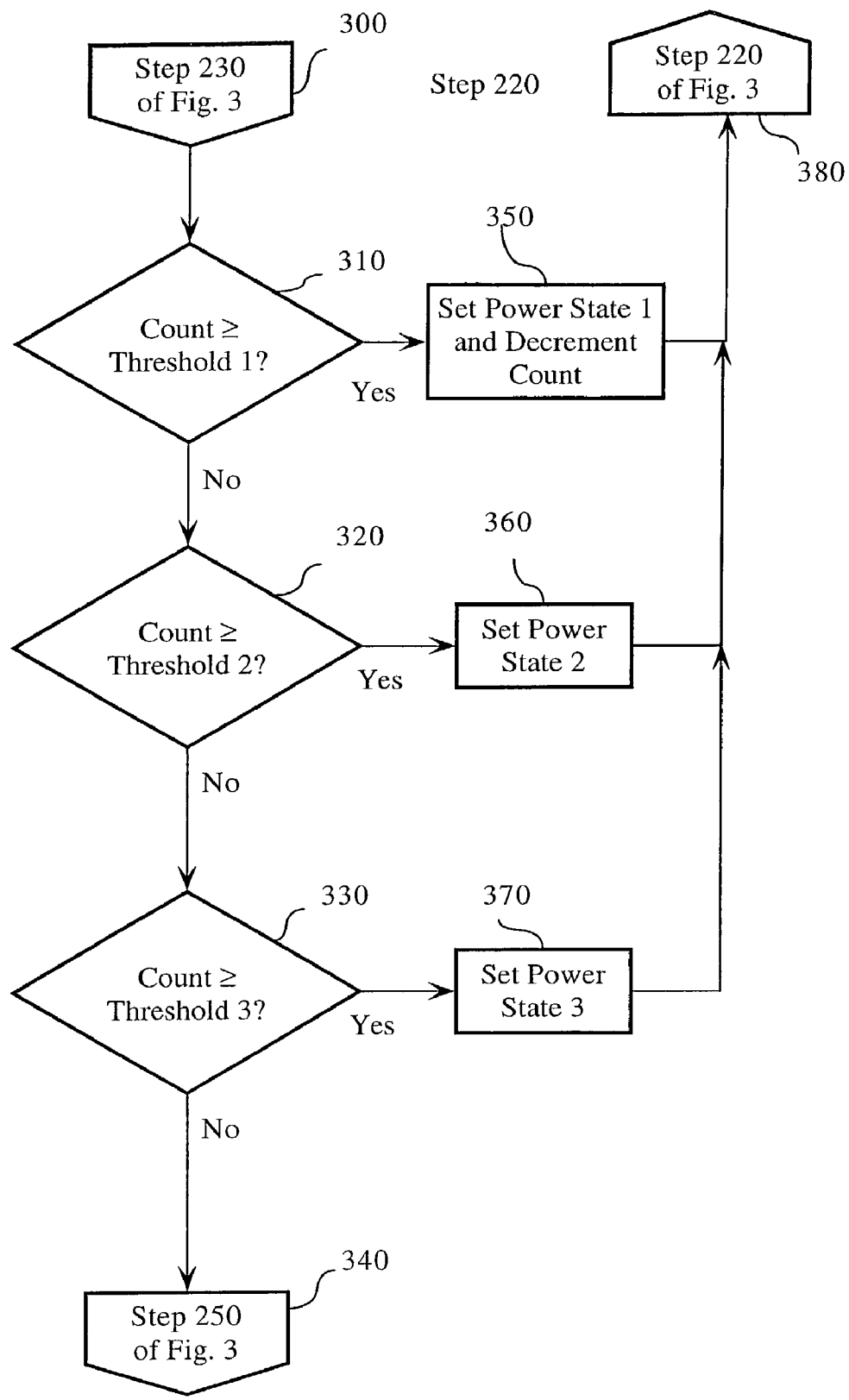
FIG. 4 illustrates a flow chart diagram illustrating several time threshold levels.

FIG. 4 illustrates a flow diagram for several power modes which replaces step 240 of FIG. 3. In FIG. 4, the timers count up and Threshold 1 has the largest value, Threshold 2 has the next largest value, and so forth. The method may be adapted to work with timers that count down. The time count is compared to a first threshold, as per step 310. If this threshold is equaled or exceeded, the monitor enters a first power conservation mode, as per step 350. The time count is also decremented by one to ensure that the count is stopped at a level. This prevents the count from rolling over and falsely indicate that a sustain command was received, causing the monitor to cycle between power conservation modes. Alternately, the timer may be implemented such that when a maximum (or minimum) count is reached, counting stops. The processing returns to step 220 of FIG. 3. If the time count does not exceed the first threshold, then it is compared to the second threshold, as per step 320. If it equals or exceeds the second threshold, it enters a second power conservation mode, as per step 360, and then goes to step 220 of FIG. 3. Otherwise, the time count is compared to the third threshold, as per step 340. If the time count equals or exceeds the third threshold, it enters a third power conservation mode, as per step 370. This method is meant to not only include three power conservation modes, but also one, two, four, five, or more.

Figure 5:
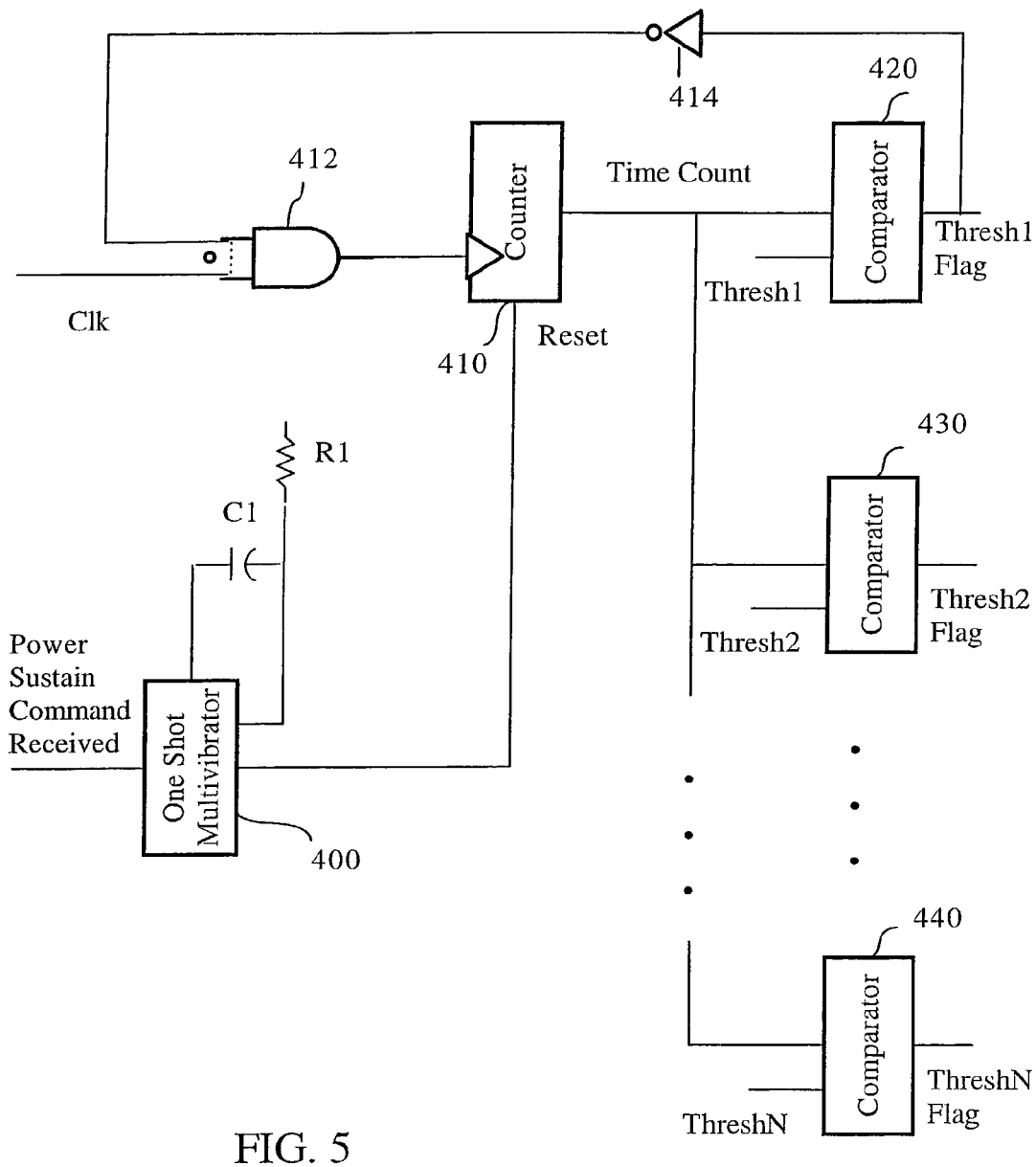
FIG. 5 illustrates an hardware implementation of FIG. 4.

FIG. 5 illustrates a hardware embodiment of the method illustrated in FIG. 4. A power sustain command or a signal representing the receipt of a power sustain command triggers a one shot monostable multivibrator 400. The length of the resulting pulse output by the monostable multivibrator 400 is determined by the RC time product of resistor R1 and capacitor C1. The pulse acts to reset counter 410. Without a reset signal, the counter 410 counts for every clock CLK from an initial count level. When the counter counts to the highest threshold value, Thresh1, the flag, Thresh1 Flag, goes high. This causes the inverter 414 to output a low value to AND gate 412 which prevents the clock CLK from causing the counter 410 to increment. The clock CLK may be internally provided in the monitor. Through a bank of comparators, the time count is compared to a first threshold, per comparator 420, a second threshold, per comparator 430, and so forth, to an Nth comparator, per comparator 440. There may be fewer or more comparators in the bank of comparators than three, such as two or five. Threshold flags are generated. A priority scheme is provided such that, as indicated in FIG. 3, the first threshold flag takes precedence. These flag bits may be latched and interpreted by a microprocessor in the interface which controls the power mode of the monitor.

Alternately, the timer may count down to a power conservation mode level. The computer system may send a power sustain command every n time units, where the time units may be minutes, seconds, or milliseconds, or some other period of time. An advantage of the present invention is the greater flexibility it offers in adjusting the time period of the power sustain command, an advantage that cannot be achieved through the use of vertical and horizontal sync signals. The monitor may set a timer to an initial count value that is not reached by the timer before the next power sustain command. If the monitor receives the power sustain command from the computer system, it simply may reset the timer. If no command is received and the timer expires or reaches a threshold value, the monitor enters a low power or off state until it receives a new command from the computer system. It may be desirable to allow the lapse of several power sustain command periods before entering a power conservation mode to prevent premature switching between power conservation modes. The timer may be programmable through commands from the computer system.

Figure 6:
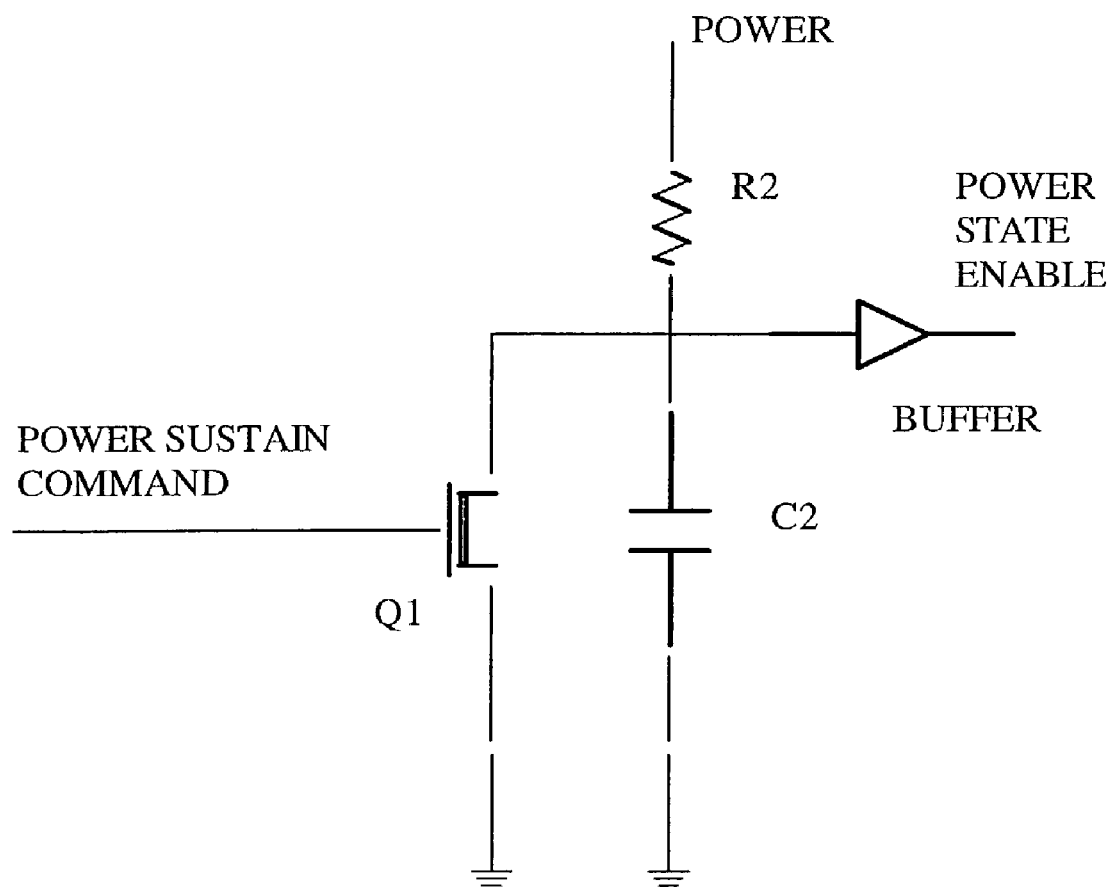
FIG. 6 illustrates a timing circuit based on the charge time of a capacitor.

The timer may include any hardware mechanism or software process that tracks the time. For example, it may be implemented through a monitor circuit which includes a monitor based clock. The timer may not even use a counting scheme. For example, the timer may include a capacitor that charges through a known resistance value, as shown in FIG. 6. When a Power Sustain Command is received, a simple transistor Q1 circuit shunts this capacitor to substantially discharge it. If no command is received, the capacitor C2 continues to charge through a rate directly proportional to R2 * C2 until it reaches a threshold voltage that is detected by a comparator or other device BUFFER, such as an input gate, that detects a positive high value and initiates a new power state. In another example, the counter may receive time information from an external source, such as the global position system, and perform arithmetic and other suitable operations to obtain time-lapse information. Two or more timing circuits having different RC time constants may be used to provide multiple timing threshold levels.

The present invention allows retrofitting a monitor or other display device without hardware changes. When using an interface, such as the DDC interface, the microprocessor or microcontroller in the monitor may already have a means to accept commands from the PC using an interface format, such as DDC. Additionally, it may already have means to signal or control other components within the monitor to reduce power consumption. In this case, no additional hardware may be needed to implement this invention in software and firmware.

Power mode status information may be made available to a user through an auditory and/or visual indicator. For instance, if the monitor switches modes, a beep may emanate from a speaker in or proximate to the monitor or a prerecorded voice message stating that a certain power mode was being entered may be played. Indicator lights, such as light emitting diodes, may light up or turn off on the front of the monitor or on a key board to indicate the power conservation mode of the monitor. Alternatively, the monitor display screen itself may display a mode indicator message for at least some of the higher power modes. This may be in the form of a screen saver with a message on it that indicates the power conservation mode. Additionally, since there can be multiple timers or thresholds, a first timer can be connected to an indicator and instead of entering a power mode, the user may be warned that the monitor will soon enter a power saving mode, giving the user time before the monitor enters the power saving mode to take corrective action.

The present invention is useable with various displays besides CRT monitors. In the case of other displays, the various power levels may control the intensity of the light projected from the screen. This is especially useful when the user of the display experiences various ambient light levels from a brightly lit room to a nearly dark room. A sensor mounted on the display may determine a light level which is then used to set the intensity of the light. A user may also be able to set the light level as desired so as to bypass the setting via a sensor. The user may select a light level through an icon, pull down menu, hot key, or the like. For example, a user may press a hot key to enter a particular power conservation mode.

The present invention is not limited to a process or circuit within a monitor. The process steps may be distributed across devices. For example, the timer may be disposed within the computer or within a peripheral device other than the monitor. The process and apparatus of the present invention may be disposed within the monitor alone, in a system with a computer, or by a computer alone.

It is believed that the method and device of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of conserving power in a monitor, comprising:
   receiving a signal by the monitor from a computer system, the signal being received via a Display Data Channel (DDC) interface for controlling power management of the monitor;
   determining by the monitor whether the signal from the computer system contains a power sustain command;
   receiving horizontal and vertical sync signals by the monitor from the computer system;
   measuring by the monitor a time interval since the last power sustain command was received;
   while receiving the horizontal and vertical sync signals, causing the monitor to enter into a first power conservation mode if a power sustain command is not received within a first threshold level time interval;
   while receiving the horizontal and vertical sync signals, causing the monitor to enter into a second power conservation mode if the time without a power sustain command reaches or passes a second threshold level time interval.

2. The method of claim 1, wherein the step of measuring by the monitor a time interval includes counting up using a timer.

3. The method of claim 1, wherein the second threshold level time interval is greater than the first threshold level, the method further comprising:
   entering a third power conservation mode if the time without a power sustain command reaches or passes a third threshold level time interval, the third threshold level time interval being greater than both the first and second threshold level time intervals.

4. The method of claim 3, further comprising the steps of:
   entering a fourth power conservation mode if the time without a power sustain command reaches or passes a fourth threshold level time interval, the fourth threshold level time interval being greater than the third threshold level time interval.

5. The method of claim 1, wherein the step of measuring by the monitor a time interval includes using a timer that is a watchdog timer.

6. The method of claim 1, wherein the first power conservation mode is a power shutdown mode.

7. The method of claim 1, wherein the method is performed for said monitor from an external peripheral device.

8. The method of claim 1, wherein the step of measuring by the monitor a time interval includes using a timer that is based on the charge up time of a capacitor.

9. The method of claim 8, wherein the capacitor is discharged every time a power sustain command is received.

10. The method of claim 1 wherein the power sustain command is a bit pattern, the bit pattern including monitor power setting instructions, the monitor power setting instructions directing which of the power conservation modes are to be entered and their order of entry during a timer count.

11. The method of claim 1, wherein said signal being received via a DDC interface is received from a video graphics adapter of the computer system.

12. The method of claim 1, wherein the power sustain command is a bit pattern.

13. The method of claim 1, wherein the power sustain command comprises monitor power setting instructions directing which of the power conservation modes are to be entered and their order of entry during a timer count.

14. A computer system for conserving power, comprising:
   a display monitor;
   an interface coupled to the display monitor for receiving horizontal and vertical sync signals and a power management signal containing a power sustain command;
   a timer for measuring a period of time since the power sustain command was last received by the interface; and
   a controller for causing the display monitor to enter into a first power conservation mode while the horizontal and vertical sync signals are received by the interface, in response to determining that said period of time exceeds a first predetermined duration, wherein said controller causes the display monitor to enter into a second power conservation mode while the horizontal and vertical sync signals are received by the interface, in response to determining that said period of time exceeds a second predetermined duration which is greater than the first predetermined duration.

15. The computer system of claim 14, wherein the power sustain command is a bit pattern.

16. The computer system of claim 14, wherein the power sustain command is a bit pattern including monitor power setting instructions, the monitor power setting instructions directing which of the power conservation modes are to be entered.

17. The computer system of claim 14, wherein the interface is a display data channel (DDC) interlace.

18. The computer system of claim 14, wherein the controller causes the display monitor to enter into a third power conservation mode while the horizontal and vertical sync signals are received by the interface, in response to determining that said period of time exceeds a third predetermined duration which is greater than the second predetermined duration, and
   wherein the controller causes the display monitor to enter into a fourth power conservation mode while the horizontal and vertical sync signals are received by the interface, in response to determining that said period of time exceeds a fourth predetermined duration which is greater than the third predetermined duration.

* * * * *